US008263191B2

(12) United States Patent
Wild

(10) Patent No.: US 8,263,191 B2
(45) **Date of Patent: *Sep. 11, 2012**

(54) METHOD FOR THE CREATION OF COLOR EFFECT IMAGES

(75) Inventor: Heinrich Wild, Herzogenaurach (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 1251 days.

This patent is subject to a terminal disclaimer.

(21) Appl. No.: 11/911,020

(22) PCT Filed: Apr. 26, 2006

(86) PCT No.: PCT/EP2006/003841

§ 371 (c)(1), (2), (4) Date: Nov. 19, 2007

(87) PCT Pub. No.: WO2006/114289

PCT Pub. Date: Nov. 2, 2006

(65) Prior Publication Data

US 2008/0213516 A1 Sep. 4, 2008

(30) Foreign Application Priority Data

Apr. 27, 2005 (DE) ......................... 10 2005 019 919

(51) Int. Cl.
*H01F 1/00* (2006.01)
*B01J 19/08* (2006.01)

(52) U.S. Cl. ........ 427/550; 427/457; 427/547; 427/548; 427/598; 427/599

(58) Field of Classification Search .................. 427/457, 427/547, 548, 598, 599
See application file for complete search history.

(56) References Cited

U.S. PATENT DOCUMENTS 3,277,244 A * 10/1966 Frost ............................... 360/17
4,081,571 A * 3/1978 Nishihama et al. ...... 430/122.51
4,859,495 A 8/1989 Peng
4,901,087 A 2/1990 Cherbuy
5,364,689 A * 11/1994 Kashiwagi et al. ........ 428/195.1
7,717,038 B2 * 5/2010 Raksha et al. ............. 101/401.1
2002/0182383 A1 12/2002 Phillips et al.
2003/0012935 A1 * 1/2003 Kuntz et al. ................... 428/209
2003/0165637 A1 * 9/2003 Phillips et al. ................ 427/598
2004/0051297 A1 * 3/2004 Raksha et al. .................. 283/57
2005/0184504 A1 * 8/2005 Alasia et al. .................... 283/72
2006/0219107 A1 10/2006 Gygi

FOREIGN PATENT DOCUMENTS

CA 2161816 5/1996
EP 0406667 A1 1/1991
EP 0710508 A1 5/1996
EP 1650042 A1 4/2006
JP 05-241482 9/1993
JP 05-265352 10/1993
JP 11-024495 1/1999
WO WO 02/090002 11/2002
WO WO02090001 A2 11/2002
WO WO2004007095 A2 1/2004
WO WO2005000585 A1 1/2005
WO WO 2005002866 * 1/2005

OTHER PUBLICATIONS

German Office Action from German Application No. 10 2005 019 919.4-51.
Communication issued on Jun. 28, 2011 by the European Patent Office for European Application No. 06 724 571.2-1215.

* cited by examiner

*Primary Examiner* — Timothy Meeks
*Assistant Examiner* — Mandy Louie
(74) *Attorney, Agent, or Firm* — Hoffmann & Baron, LLP

(57) ABSTRACT

There is described a method of producing color effect images on a carrier substrate, wherein it is provided that a latent magnetic image comprising magnetic pixels and non-magnetic pixels is produced on a magnetizable printing form, a carrier substrate with a decorative layer applied to the carrier substrate and provided with non-spherical, preferably needle-form or flake-form magnetic color effect pigments is moved past the magnetizable printing form so that color effect pigments of the decorative layer are changed in their orientation relative to the carrier substrate by the field line image produced by the magnetic pixels of the magnetizable printing form, and the color effect pigments are fixed in the decorative layer in the orientation which is changed by the field line image of the printing form. There is further described an apparatus for carrying out the method and a multi-layer body produced therewith.

17 Claims, 11 Drawing Sheets

METHOD FOR THE CREATION OF COLOR EFFECT IMAGES

This application claims priority based on an International Application filed under the Patent Cooperation Treaty, PCT/EP2006/003841, filed on Apr. 26, 2006 and German Application No. 102005019919.4-51, filed on Apr. 27, 2005.

BACKGROUND OF THE INVENTION

The invention concerns a method of producing color effect images on a carrier substrate, an apparatus for producing a color effect image and a multi-layer body with a color effect image.

Magnetic effect pigments which iridesce in color are used for decorative purposes in order to produce color effects which are dependent on the viewing angle, on the surfaces which are coated with those pigments. The operating principle of the color change is the interference effect which is to be observed in relation to thin layers and the orientation of the pigment particles upon application to the surface to be coated, by a magnetic field. In that way it is possible to form groups of pigment particles which are arranged in the same direction in one orientation and which can be optically delimited in relation to groups involving a different orientation or in relation to groups with randomly arranged pigment particles.

Apparatuses and methods are known which provide for orienting the magnetic pigment particles by means of permanent magnets which are arranged under and/or over the substrate which is to be coated with the pigment particles.

WO 02/090002 A2 describes a method of producing articles which are coated in color, by using magnetic pigments. It is provided that in respect that the magnetic pigments are embedded in a UV-hardenable lacquer and the lacquer is exposed successively through masks of differing configurations, wherein prior to each exposure operation the lacquer is exposed to a respective magnetic field involving a different direction. The exposure effect causes the pigments in the region exposed to the UV light to be fixed in their positional orientation which is predetermined by the applied magnetic field.

WO 2004/007095 A2 provides for orienting the magnetic pigments by magnets and/or groups of magnets which, by virtue of their size, arrangement and magnetic polarity, produce magnetic line configurations to which the magnetic pigments of a pigment layer are oriented. After hardening of the lacquer the magnetic pigments are fixed in position. It is further provided that the magnets are formed with the cross-section of the pattern to be printed, for example with a cross-section in the form of a star.

Both methods suffer from the disadvantage that apparatuses are required, which are adapted to the image or image effect to be produced, which are complicated and expensive in regard to production and use and which require a high level of complication and high costs upon changes in design.

SUMMARY OF THE INVENTION

Now the object of the present invention is to provide an improved method of producing color effect images and an apparatus for carrying out that method.

The object of the invention is attained in that there is provided a method of producing color effect images on a carrier substrate, wherein it is provided that a latent magnetic image comprising magnetic pixels and non-magnetic pixels is produced on a magnetisable printing form, a carrier substrate with a decorative layer applied to the carrier substrate and provided with non-spherical, preferably needle-form or flake-form magnetic color effect pigments is moved past the magnetisable printing form so that color effect pigments of the decorative layer are changed in their orientation relative to the carrier substrate by the field line image produced by the magnetic pixels of the magnetisable printing form, and the color effect pigments are fixed in the decorative layer in the orientation which is changed by the field line image of the printing form.

The object is further attained by an apparatus for producing a color effect image on a carrier substrate, wherein it is provided that the apparatus has an application device for applying a decorative layer with non-spherical, preferably needle-form or flake-form magnetic color effect pigments in a binding agent to a carrier substrate, a magnetisable printing form on which a latent magnetic image of magnetic pixels and non-magnetic pixels is produced, a transport device and a fixing device, the transport device is of such a configuration that it moves the carrier substrate with the applied decorative layer past the magnetisable printing form in such a way that color effect pigments of the decorative layer are changed in their orientation relative to the carrier substrate by the magnetic field line image produced by the magnetic pixels of the printing form, and the fixing device is arranged for fixing the color effect pigments in the orientation which is changed by the field line image of the printing form.

The object is further attained by a multi-layer body comprising a decorative layer which has spherical, preferably needle-form or flake-form magnetic color effect pigments, wherein the color effect pigments are arranged in the decorative layer to afford a color effect image, wherein it is provided that the color effect image is formed from pixels which are arranged in a raster grid in row-wise and column-wise manner and the color effect image has color effect pixels in which the color effect pigments are respectively arranged in a preferably uniformly ordered spatial position such that the brightness and/or the color of the respective color effect pixel is or are configured in dependence on the position of the color effect pigments and/or the viewing direction and/or the wavelength and/or the polarisation of the light directed on to the color effect pixel.

The method provides for the creation of a digital data set in respect of the color effect image and using that to produce a latent magnetic image, by means of which the magnetic color effect pigments are oriented. Such a method does not require the production of especially adapted magnets but instead thereof provides for the use of an apparatus which is controllable by a digital data set.

The method according to the invention is distinguished by speed, high productivity, low costs, high flexibility and long service lives and permits design changes with a low level of complication and low cost levels.

The multi-layer body according to the invention can be formed with further layers, for example with optical and/or electrical functional layers. By way of example the multi-layer body can be in the form of a security element as is used for protecting documents and/or goods. It can also be provided that the multi-layer body is provided with further layers after application of the color effect image, in further method steps. Preferably the color effect image has two or more color effect pixels of differing nature, in respect of which the color effect pigments are respectively arranged in a differing orientation in relation to the carrier substrate. It is possible in that way to represent rastered multiple images.

Further advantageous configurations of the invention are set forth in the appendant claims.

It can be provided that the carrier substrate and the printing form are moved at a speed which is identical in terms of value and direction as long as the color effect pigments are mobile in the binding agent so that the relative speed between the carrier substrate and the printing form is equal to zero. For that purpose the carrier substrate can be pressed against the printing form with rollers so that the carrier substrate and the printing form are moved synchronously.

In a further advantageous configuration it can be provided that magnetic pixels are produced in the printing form, which pixels differ in respect of the strength of the magnetic field and/or in the direction of the magnetic field lines. In that way, different field line images can be produced with the same arrangement of the magnetic pixels. That also determines the arrangement and distribution of the magnetic pixels by way of the orientation of the magnetic color effect pigments. It can therefore be provided that mutually juxtaposed magnetic pixels are produced with a differing orientation.

Because the latent magnetic image is formed from a matrix of magnetic pixels, the configuration of the magnetic field lines which determine the color effect image by virtue of orientation of the color effect pigments is substantially determined by the magnetic properties of the magnetic pixels. With an image resolution of 600 dpi per square inch for example 600×600=360,000 pixels are formed. It can therefore be provided that the development of a theoretical mathematical model is dispensed with, and instead an empirical approximation model is developed by series of tests and that model is converted into an image processing program. In that fashion the digital data set which reproduces the color effect image as a surface of uniform configuration can be selected as the starting basis for calculating the data of the pixels for producing the color effects.

Interesting optical effects can already be afforded with few basic arrangements. The magnetic pixels can be arranged for example to produce regions of the field line image, in which the magnetic field lines are directed in perpendicular relationship to the surface of the carrier substrate or in which the magnetic field lines are directed in parallel relationship to the surface of the carrier substrate. It is also possible for the magnetic pixels to be arranged to produce regions of the field line image in which the magnetic field lines are directed in fan form at different angles in relation to the surface of the carrier substrate. It can further be provided that the magnetic pixels are arranged to produce regions of the field line image, in which the magnetic field lines are directed in an arcuate form at different angles in relation to the surface of the carrier substrate.

Those above-described arrangements and configurations of the pixels are by way of example in respect of the many different possible options in terms of the configuration of field line images within the scope of the method according to the invention. It can further be provided that non-magnetic pixels are incorporated, which are covered over by the field lines of adjacent magnetic pixels and thereby contribute to forming the magnetic field line image.

Different arrangements of the color effect pigments result from the different field line images. By way of example a region of the field effect pigment with a perpendicular arrangement of the color effect pigments appears dark when viewed perpendicularly, but increasingly brighter when viewed inclinedly, in which respect color effects can additionally be produced. A region with magnetic color effect pigments arranged in a fan form produces on the part of the viewer the illusion of a plastic or three-dimensional representation. In this example, starting from a center line in which the color effect pigments are oriented perpendicularly, the left-hand side of the image is brightened up upon tilting of the color effect image, and vice-versa. A region with color effect pigments which are oriented in an arcuate shape at different angles relative to the surface of the carrier substrate forms a light strip which passes over the color effect image when the latter is tilted to and fro.

It can also be provided that the color effect image is rastered in strip form in such a way that two or more color effect images are laid one over the other. If now a tilt angle or tilt angle range is associated with each of the color effect images, the individual color effect images become visible in succession.

The above-described optical effects are caused by the magnetic field effect pigments involving non-spherical pigments in strip or bar form, with a magnetic core and a casing, which can give rise to color effects. Those elongate color effect pigments, unlike spherical pigments, can not only be arranged along the magnetic field lines, but also oriented in relation thereto. Therefore, a first optical effect which is dependent on the viewing angle is already afforded by the configuration of the color effect pigments, irrespective of the nature of the surface coating. The ends of the color effect pigments, which are almost in point form, reflect little light and therefore form dark regions when a uniform orientation is involved, while the peripheral surfaces of the color effect pigments reflect more light and thus constitute light regions, when a uniform orientation is involved. A second optical effect which is dependent on the viewing angle can be caused by a surface coating on the color effect pigments, which produces optical effects based on refraction, diffraction or polarisation. The surface coating can be for example a thin layer system which can form the color shift effect which is known from films of oil and which is dependent on the viewing angle, a mirror layer or a cholesteric liquid crystal layer. It is possible in that way to produce optical effects which are dependent on the viewing angle and/or the illumination direction and/or the light wavelength and/or polarisation of the light.

A color effect image can be produced by the digital data set including pixels of the binary value '1' and pixels of the binary value '0'. The latent magnetic image is therefore formed from magnetic and non-magnetic pixels. The magnetic color effect pigments are now oriented in the region of a magnetic pixel while they are disposed in a non-ordered, random position in the region of a non-magnetic pixel. The regions are optically delimited from each other by virtue of the differing orientation of the color effect pigments in the two regions referred to above. Color effect pigments arranged on a non-magnetic pixel do not have a preferred orientation. Brightness and/or color value of the non-magnetic pixel can be independent of the viewing and/or illumination direction. In contrast brightness and/or color value of the magnetic pixel are dependent on the viewing direction and/or the illumination direction for they are arranged uniformly or in accordance with a predetermined scheme.

In a further advantageous configuration it can be provided that the magnetic color effect pigments are oriented by the action of magnetic pixels and electromagnetic print heads.

It can further be provided that the magnetic color effect pigments are oriented by a time succession of the action of magnetic pixels and/or electromagnetic print heads. The magnetic color effect pigments can thus be moved into the final position in which they have the desired optical effect in successive steps in which they can assume intermediate positions.

Although the color effect pigments are mobile in the binding agent, the magnetic orientation procedure is not an inertia-less process. It can therefore also be provided that the magnetic color effect pigments are oriented by a time-limited magnetic pulse.

It can be provided that one of the print heads as a first electromagnetic print head which embraces the printing form orients the magnetic color effect pigments parallel to the top side of the carrier substrate, an electromagnetic erasing head produces the non-magnetic pixels and the electromagnetic print head produces the magnetic pixels.

The print head embracing the printing form can have a slot through which the printing form is passed, which for example can be a printing form in the form of an endless belt or in the form of a rotating drum. The electromagnetic erasing head can advantageously be formed in line form from individually actuable magnetic heads. Such an erasing head can provide an erasing action in pixel-wise manner, that is to say it can produce a pixel in the form of a non-magnetic pixel and/or actively bring color effect pigments into a non-ordered position. It can be provided that the non-magnetic pixels are produced with the erasing head and in that case the pixels which were previously produced are erased there and further non-magnetic pixels are produced, which are to be subsequently overwritten with a fresh magnetic pixel. It is advantageously provided that the erasing head is activated only when the image line produced by the preceding first print head is arranged under the erasing head.

It can be provided that electromagnetic print heads which produce the latent magnetic image on the magnetisable printing form are actuated in accordance with a first digital data set which describes the arrangement of the magnetic pixels and non-magnetic pixels. It is possible in that way to preferably produce color effect images in which the color effect pigments arranged in the magnetic pixels are oriented in the same fashion.

A further configuration provides that the first data set is computed by a computer from a second data set which describes the graphic configuration of the color effect image. The possible color effect image configurations deriving therefrom are described in greater detail herein before.

The method according to the invention provides that a decorative layer in which the magnetic color effect pigments are incorporated in a binding agent in such a way that they can be oriented by the latent magnetic field is applied to the carrier substrate as the decorative layer. It can preferably be provided that the viscosity of the binding agent is so set that the color effect pigments can move freely. Acrylates can be provided as the binding agent. The solids proportion can be between 20% and 40%, and the viscosity can be set to between 100 Pa s and 1600 Pa s, preferably to between 200 Pa s and 300 Pa s. When the decorative layer is applied over a surface area or in strip form, the color effect image produced by the method according to the invention stands out visually from the image background because the color effect pigments arranged in the image background are disposed in a random position while the color effect pigments in the region of the color effect image are oriented in a predetermined fashion, thereby give rise to the optical effects described hereinbefore, and thus stand out visually from the neutral image background.

It can be provided that the color effect pigments are fixed after orientation in the decorative layer by drying or by cross-linking of the binding agent. In that respect the term drying is used to denote that the binding agent is converted from the liquid into the solid state by a solvent component being expelled. The binding agent however can also be a binding agent which can be converted from the liquid state into the solid state by a chemical reaction, in which case it can be formed from one or more components.

If the binding agent is a cross-linkable binding agent it can be provided that the binding agent is cross-linked by UV radiation.

In a further advantageous configuration it is provided that the carrier substrate is supplied and removed in a roll-to-roll process.

An advantageous configuration of the apparatus according to the invention provides that the apparatus includes a first electromagnetic print head which embraces the printing form and/or the carrier substrate, an electromagnetic erasing head arranged downstream of the first electromagnetic print head, and at least one further electromagnetic print head which is arranged downstream of the erasing head and the magnetic field lines of which are directed in parallel relationship with the surface of the printing form and/or of the carrier substrate.

Two adjacent magnetic pixels can therefore be formed with that apparatus with differing magnetic orientation and/or magnetic polarity and/or magnetic force.

It can be provided that the electromagnetic print heads and/or the electromagnetic erasing head have mutually juxtaposed magnetic heads, which form a print line oriented in perpendicular relationship to the transport direction of the printing form and/or the carrier substrate.

It can further be provided that the number of magnetic heads in a print line is equal to the number of pixels of an image line of the color effect image. That makes it possible to achieve a particularly high printing speed because an image line is formed in one step on the magnetic printing form.

A further embodiment provides that the electromagnetic print heads and/or the electromagnetic erasing head have one or more magnetic heads which are arranged positionably pixel-wise along the print line oriented in perpendicular relationship with the transport direction of the printing form and/or of the carrier substrate. Magnetic heads which are positionable pixel-wise are not subject to the spatial limitations of magnetic heads which are arranged in mutually juxtaposed relationship at the pixel spacing and can therefore be designed for example with a higher level of magnetic force.

It can further be provided that the magnetic head or heads are arranged pivotably about an axis which is parallel to the surface of the carrier film and/or about an axis which is perpendicular to the surface of the carrier film.

It can be provided that the magnetic heads are arranged over the printing form and/or over the carrier substrate. Alternatively it can be provided that the magnetic heads are arranged in mutually opposite paired relationship over and under the printing form and/or the carrier substrate. The paired arrangement of the magnetic heads can be advantageous in order to produce a particularly vigorous and homogenous magnetic field.

In a further configuration, to produce magnetic pixels of differing polarity, two successively arranged electromagnetic print heads can be provided, which are formed from individually actuable magnetic heads with a common ground line. Each of the two print heads therefore forms only magnetic pixels of one polarity. Such a configuration can permit a particularly simple structural solution, in particular a space-saving configuration. Alternatively it is possible to provide only one such print head with a common ground line, in which respect the production of the pixels of differing magnetic polarity is provided in succession.

It can further be provided that the erasing head and/or the print head or the print heads form a combi-head. In that fashion, the nature of actuation, that is to say the current strength, current direction and duration of the current flowing through the magnetic winding of the magnetic head, determines whether an actuated magnetic head of the combi-head is used as an erasing head or as a print head. It can therefore be provided that the magnetic head is sequentially actuated to produce the magnetic pixel, for example in the first sequence it is supplied with high-frequency alternating current and acts as an erasing head and in the second sequence it is supplied with direct current and thus brings the elementary magnets of the magnetic pixel into an ordered position in perpendicular relationship to the printing form.

In a further advantageous configuration there is provided a circulating endless printing form, wherein the printing form can be for example in the form of an endless print belt or in the form of a printing drum.

In a further advantageous configuration it is provided that the transport device is in the form of a stepping drive, wherein the stepping distance is equal to the image line spacing of the color effect image. Such a configuration is advantageous if electromagnetic print heads are provided directly for orientation of the magnetic color effect pigments.

It can be provided that the application device for applying the decorative layer is in the form of a mechanical printer, for example in the form of a printing roller or in the form of a squeegee device. The printing roller can be a profiled or a non-profiled printing roller. The printing roller can be profiled for example in the contours of the color effect image and can thus apply the decorative layer to the carrier substrate in the form of a relief print roller or in the form of an intaglio print roller.

It can be provided that the fixing device has a thermal source for drying the binding agent of the decorative layer and/or a UV source for cross-linking of the binding agent.

BRIEF DESCRIPTION OF THE DRAWINGS

The invention is described by way of example hereinafter by means of a number of embodiments with reference to the accompanying drawings in which.

DETAILED DESCRIPTION OF THE INVENTION

Figure 1:
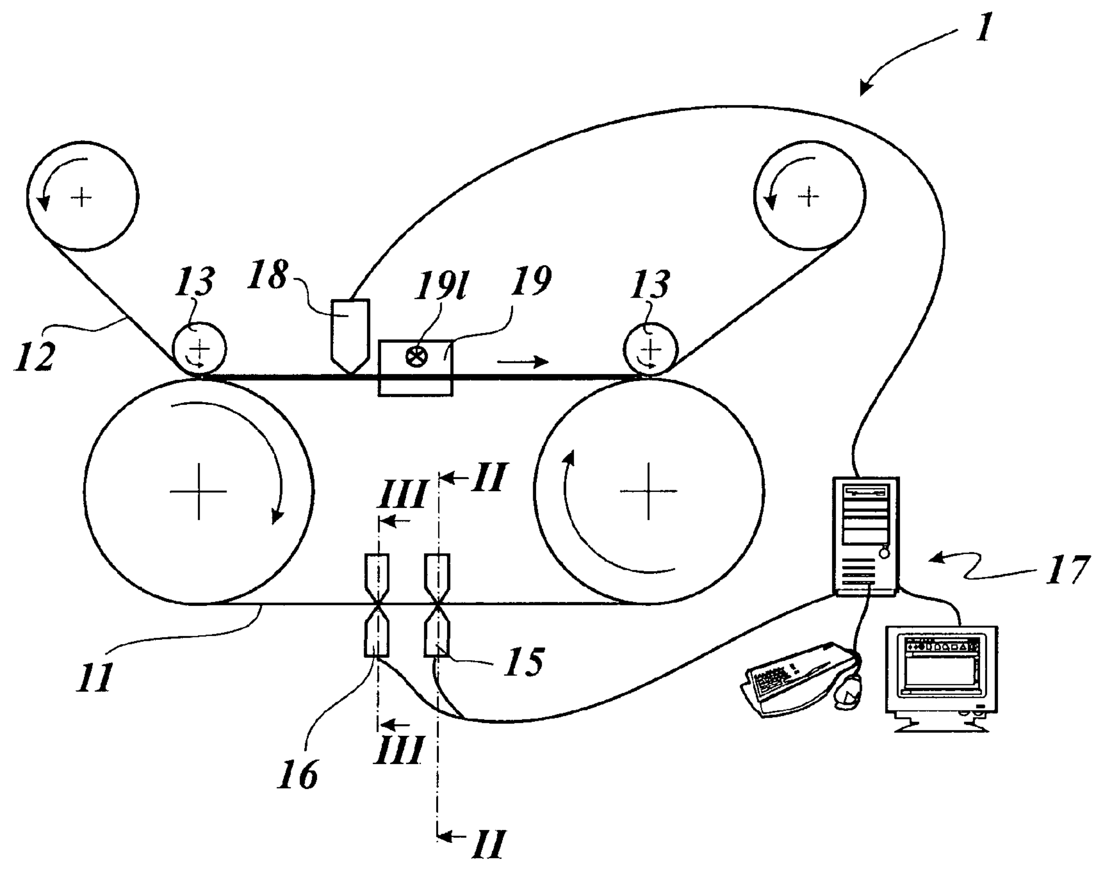
FIG. 1 is a diagrammatic view of a first embodiment of an apparatus according to the invention.

FIG. 1 is a diagrammatic view of a first embodiment by way of example of an apparatus 1 according to the invention.

A soft-magnetic print belt 11 is stretched horizontally between two mutually spaced transport rollers 11*t* and is continuously driven by them. The soft-magnetic print belt 11 is a print belt in which magnetic pixels can be formed, by a procedure whereby the magnetic coercive force of the print belt is exceeded in the region of the pixel by the action of an external magnetic field. Now, by virtue of the uniform orientation of its elementary magnets, the magnetic pixel is in the form of a permanent magnet and remains in that state until it is restored again to its non-magnetic initial state by the application of a magnetic field of opposite polarity.

A carrier film 12 is fed to the print belt 11 from above in a continuous roll-to-roll process and in that operation is pressed against the print belt 11 by pressure rollers 13. In the embodiment shown in FIG. 1 the pressure rollers 13 are arranged in such a way that they press the carrier film 12 and the print belt 11 on to the transport roller 11*t* and thus provide for intimate contact between the carrier film 12 and the print belt 11. Only two pressure rollers 13 are shown in the diagrammatic view of FIG. 1. It can however be provided that further pressure rollers are respectively arranged in paired mutually opposite relationship between the two outer contact locations in order to improve the contact between the carrier film 12 and the print belt 11.

An electromagnetic erasing head 15 and an electromagnetic print head 16 are arranged in succession in the direction of flow in the lower portion of the print belt 11 which is stretched between the two transport rollers 11*t*. The erasing head 15 and the print head 16 are connected to a computer station 17 in which a digital data set of a color effect image is stored.

A print head 18 and a fixing device 19 are arranged in succession in the direction of flow in the upper portion of the print belt 11 which is stretched between the two transport rollers 11*t*.

Figure 2:
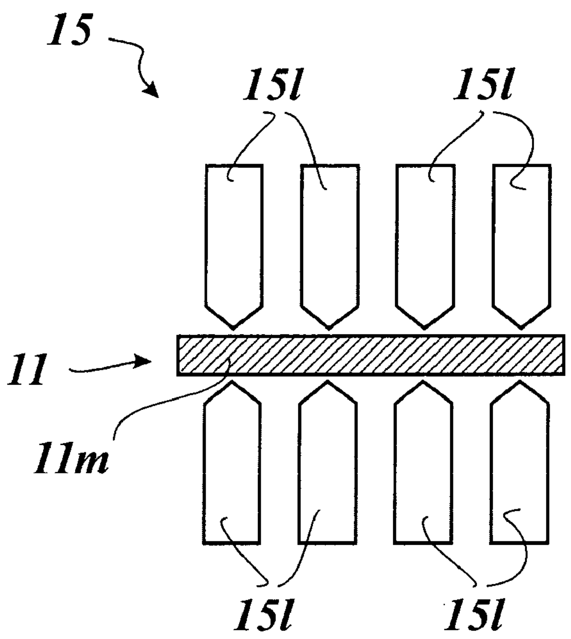
FIG. 2 is a diagrammatic view in section of an erasing head taken along section line II-II in FIG. 1.

As is shown in a diagrammatic view in section in FIG. 2, the erasing head 15 is formed from mutually juxtaposed magnetic heads 15*l*. The number of magnetic heads 15*l* can correspond to the number of pixels of an image line of the color effect image. In this embodiment the magnetic heads 15*l* are arranged spaced from each other at the pixel spacing. With magnetographic printing processes at the present time it is possible to achieve resolutions of 600 dpi, that is to say 600 pixels can be represented per inch (1 inch=25.4 mm). With such a resolution the pixel spacing is about 40 μm.

The magnetic heads have a soft-magnetic core which is surrounded by one or more turns of an electrical conductor and which can generate a magnetic field when an electric current flows through its electrical conductor. Non-magnetic pixels 11*u* can be produced in the print belt 11 between two mutually opposite magnetic heads 15*l* when alternating current flows through the magnetic heads. A high-frequency alternating current can preferably be provided for that purpose. As shown in FIG. 1 the erasing head 15 is actuated by the computer station 17.

As shown in FIG. 2 it can be provided that the magnetic heads 15*l* are respectively arranged in paired mutually spaced relationship and the print belt 11 is passed through the slot which is formed between them. It can however also be provided that the magnetic heads 15*l* are arranged only on the top side or the underside of the print belt 11.

Figure 3:
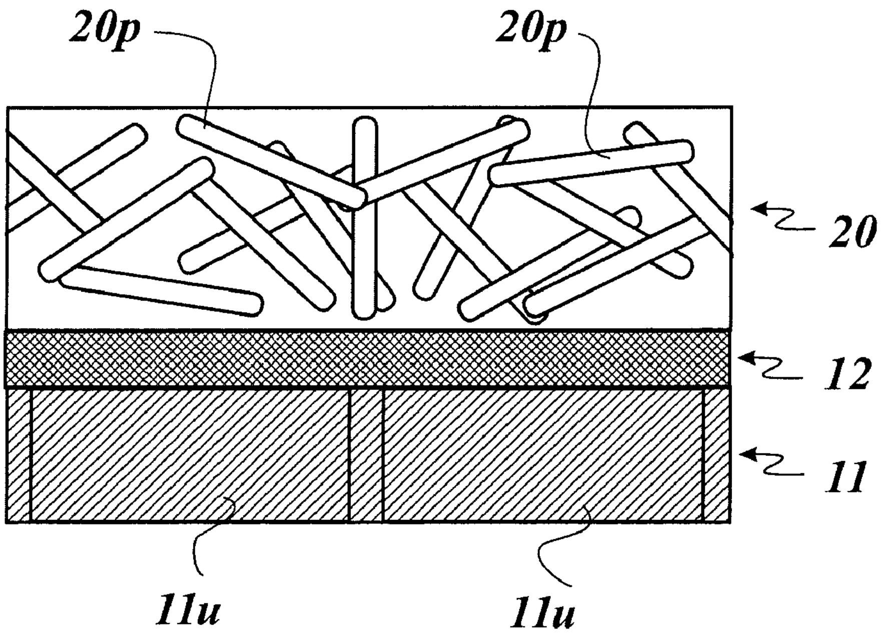
FIG. 3 is a diagrammatic view in section of a first example of an arrangement of color effect pigments.

FIG. 3 is a diagrammatic view showing a portion of the print belt 11 with non-magnetic pixels 11*u*, over which color effect pigments 20*p* are arranged in a non-ordered, that is to say random position.

Figure 4:
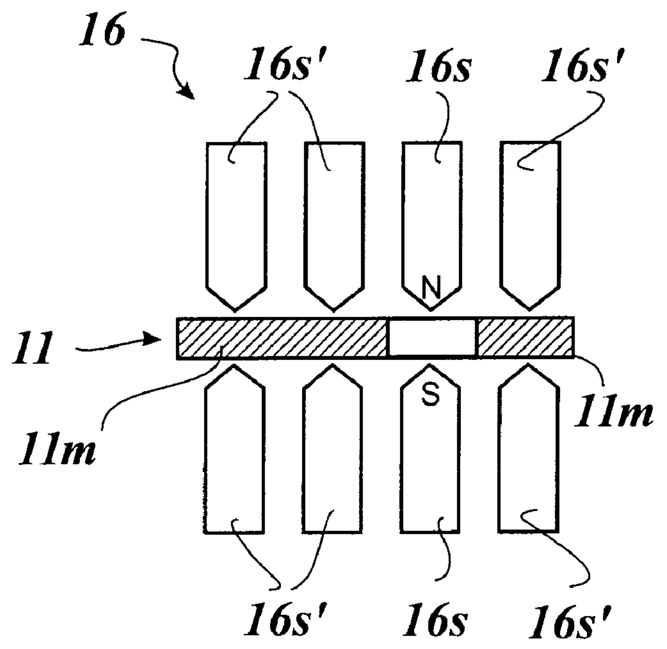
FIG. 4 is a diagrammatic view in section of a writing head taken along section line IV-IV in FIG. 1.

The writing head 16 can in principle be designed like the erasing head 15, that is to say it can be formed from a line of mutually juxtaposed magnetic heads 16*s* and 16*s*' (see FIG. 4). Magnetic pixels 11*m* can be produced in the print belt 11 between two mutually opposite magnetic heads 16*s* through which current flows. The magnetic heads 16*s*' are magnetic heads which do not have current flowing therethrough, that is to say no magnetic field is generated between them.

As shown in FIG. 1 the writing head 16 is actuated by the computer station 17. In that respect it can be provided that by the choice of the current direction, magnetic pixels 11*m* are formed, which differ from each other in respect of the orientation of their magnetic poles. Adjacent magnetic pixels 11*m* can therefore be arranged with the same or with a different arrangement of the magnetic poles whereby different field line configurations can be produced between two magnetic pixels. Adjacent magnetic pixels 11*m* with the same orientation in respect of the magnetic poles form repulsion forces while adjacent magnetic pixels 11*m* involving a differing orientation of the magnetic poles produce attraction forces. The magnetic and non-magnetic pixels form in the printing form 11 a latent magnetic image which is intended for the orientation of magnetic color effect pigments 20*p* (see FIG. 3).

The print head 18 is advantageously in the form of a digital print head for the application of colors or inks and is actuable by the computer 17. The illustrated embodiment provides that the print head 18 applies a decorative layer 20 (see FIG. 3) to the carrier substrate 12. The decorative layer 20 is formed from the magnetic color effect pigments 20*p* and a binding agent. The print head 18 can be moved by a stepping motor (not shown) along an image line of the color effect image and in that fashion can apply the decorative layer 20 pixel-wise. In a further configuration, the print head 18 can have a plurality of ink supply containers so that, besides the decorative ink, it is possible to apply further inks. It is possible in that way, together with the color effect image, to print an image representation which for example forms the area surrounding the color effect image. Instead of the digital print head it is also possible to provide a squeegee roll or the like in order to print the decorative layer 20 on the carrier film 12 over the full surface area involved or in strip form.

The viscosity of the binding agent of the decorative layer 20 in which the color effect pigments 20*b* are bound is so set that the color effect pigments 20*b* are freely mobile in the binding agent. The binding agent can involve a solution which can be hardened by evaporation of a solvent. It can however also involve a polymer which is cross-linkable by heat or by UV light.

The freely mobile bar-form magnetic color effect pigments 20*p* of the decorative layer, which are applied to the carrier film 12 in a non-ordered position, are now oriented along the magnetic field lines of the latent magnetic image produced in the print band 11. In that fashion, the color effect pigments 20*p* can be put into such a position that a color effect which is dependent on the viewing angle and/or the illumination direction is produced, which is described in greater detail hereinafter.

In the fixing device 19 which is arranged downstream of the print head 18 the color effect pigments 20*p* are now fixed in position on the carrier film 12. For that purpose the fixing device can have a lamp 19*l* which can be in the form of a thermal source or a UV source. As can be seen from FIG. 1 the carrier film 12 and the print belt 11 are at relative rest when they are moved through beneath the print head 18 and through the fixing device 19. Therefore the magnetic color effect pigments 20*p* are reliably fixed in their position by the magnetic field lines emanating from the print belt 11, prior to hardening of the binding agent.

As the latent magnetic image produced on the print belt 11 is not subject to any wear, it can be provided that the magnetic head 14, the erasing head 15 and the writing head 16 are taken out of operation when the print belt 11 is completely written and are only brought back into operation again when the print belt 11 is to be freshly written.

Figure 5:
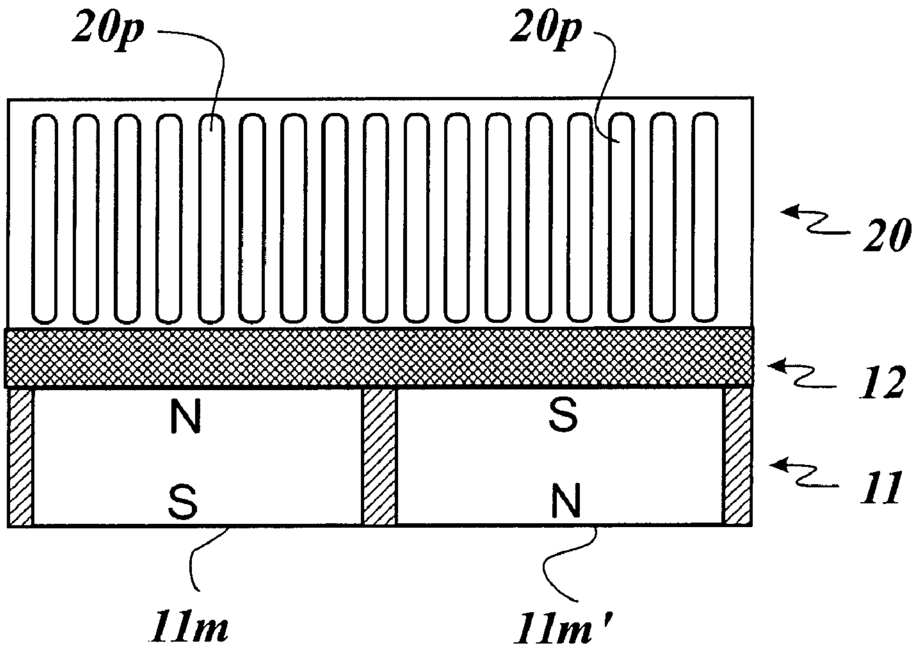
FIG. 5 is a diagrammatic view in section of a second example of an arrangement of color effect pigments.

FIG. 5 now shows a diagrammatic view of a portion of the print belt 11 with magnetic pixels 11*m* and 11*m*', on which is arranged the carrier film 12 with a decorative layer 20 printed thereon. Magnetic field lines which are not shown in FIG. 5 and which are directed in perpendicular relationship to the outside surface of the print belt 11 extend from the magnetic pixels 11*m* and 11*m*'. In the example shown in FIG. 5 the two adjacent magnetic pixels 11*m* and 11*m*' are of different magnetic polarities. Consequently adjacent color effect pigments 20*p* attract each other so that the color effect pigments 20*p* are arranged in approximately parallel relationship and standing upright on the carrier film 12. By virtue of an alternate arrangement of further pixels 11*m* and 11*m*', a macroscopic region with perpendicularly oriented color effect pigments 20*p* can be formed in that fashion in the decorative layer 20.

Figure 6A:
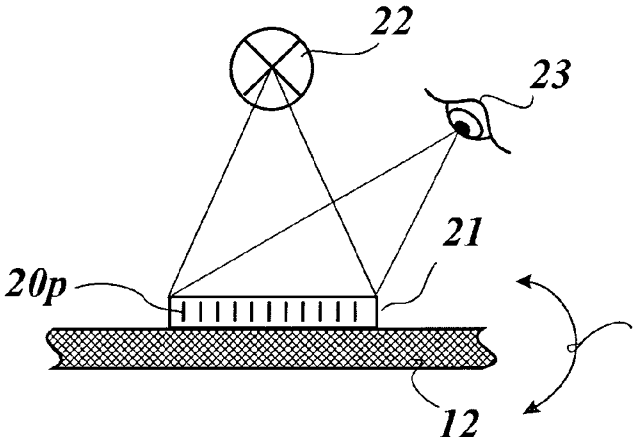
FIG. 6*a* is a view showing the principle of a first example of use.
Figure 6D:
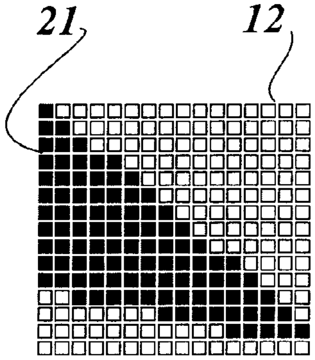
FIG. 6*d* shows a portion VId on an enlarged scale from FIG. 6*b*.
Figure 6B:
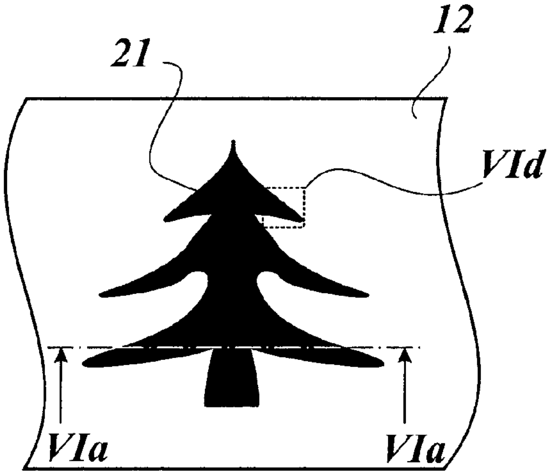
FIGS. 6*b* and 6*c* are plan views at different viewing angles for the example of use shown in FIG. 6*a*.
Figure 6C:
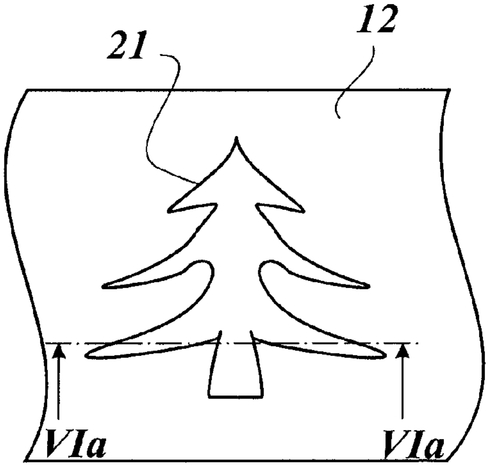

FIGS. 6*a* through 6*c* now show what optical effect can be produced with the orientation of the color effect pigments 20*p* as shown in FIG. 5. FIGS. 6*b* and 6*c* show a color effect image 21 arranged on the carrier film 12. As shown in section in FIG. 6*a*, it is illuminated by a light source 22 disposed above the color effect image 21 and observed by a viewer, in the eye 23 of whom a representation of the color effect image 21 is produced. The viewer sees the color effect image 21 at various angles when he pivots it or when he correspondingly inclines his head. The pivotal range of the color effect image is identified in FIG. 6*a* by a curved double-headed arrow α. Because the color effect pigments 20*p* are arranged perpendicularly on the carrier film 12 the color effect image 21, as shown in FIG. 6*b*, appears dark to the eye 23 of the viewer when the viewing direction is perpendicular. Upon pivotal movement of the color effect image 21 the incident light is now reflected by the side faces of the color effect pigments 20*p*. Consequently, as shown in FIG. 6*c*, the color effect image 21 appears brighter to the eye 23 of the viewer, with an increasing pivotal angle, and in that case presents color changes which can be caused by the coating of the color effect pigments 20*p* with thin refracting layers.

FIG. 6*d* is a view on an enlarged scale of an image portion VId from FIG. 6*b* illustrating by way of example the formation of the color effect image 21 from individual pixels which are identified as black surfaces in FIG. 6*d*. In the embodiment shown in FIG. 6*d* the background of the color effect image is also formed from pixels which are applied to the carrier film 12 and which involve pixels which are not covered with color effect pigments. Those pixels are shown as white surfaces in FIG. 6*d*. As can be seen from FIG. 6*d* the outside edges of the color effect image 21 are stepped in a staircase configuration by virtue of being formed from pixels, in which respect that stepped configuration is not discernible to the eye of the viewer.

Figure 7:
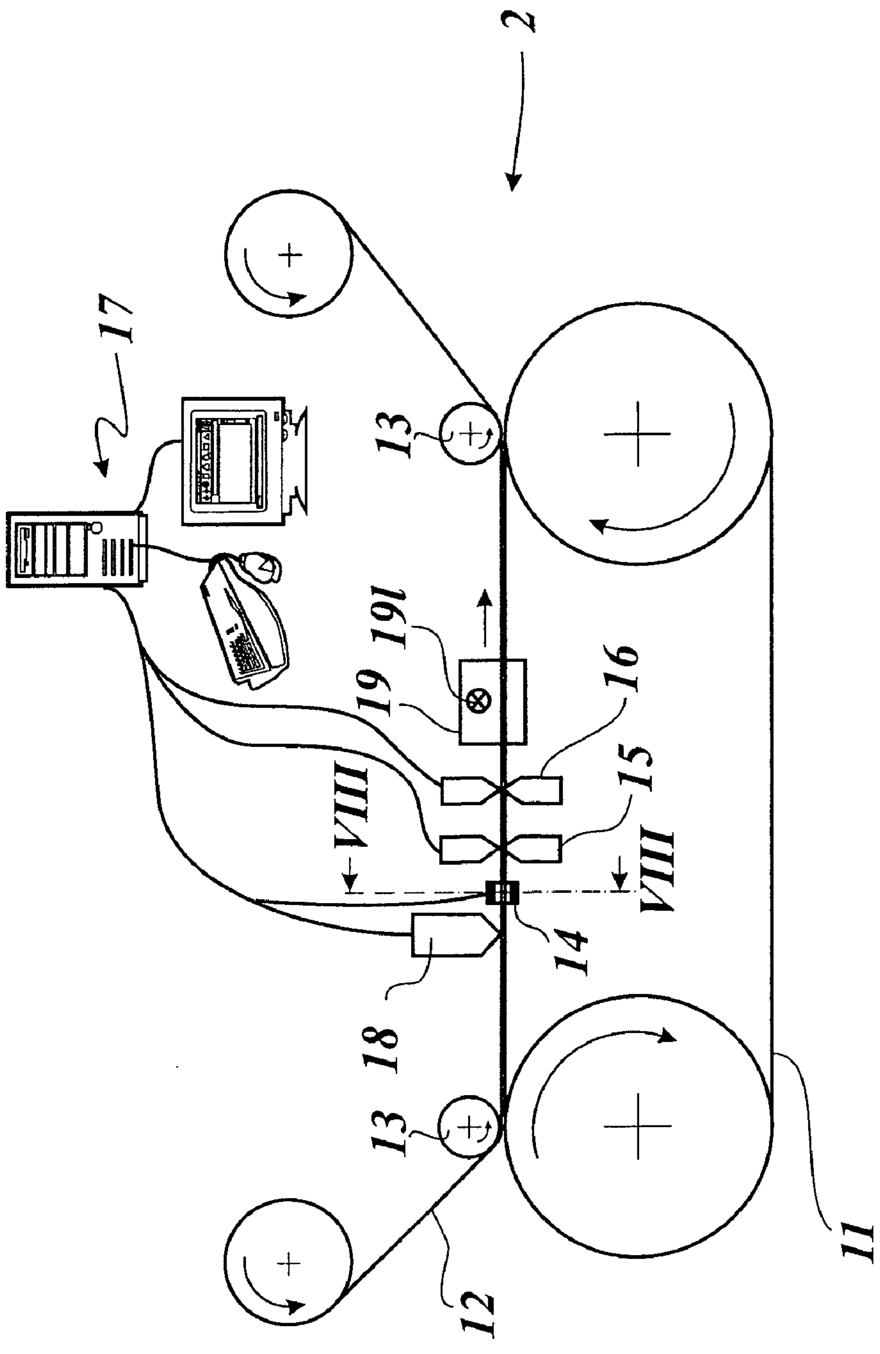
FIG. 7 is a diagrammatic view of a second embodiment of an apparatus according to the invention.

FIG. 7 now shows a second embodiment of an apparatus according to the invention. Identical components are denoted by the same references. The carrier film 12 is fed to the circulating print belt 11 from a roller and is brought into contact with the print belt by the pressure rollers 13 which are disposed in opposite relationship to two mutually spaced transport rollers. The print head 18, an electromagnetic print head 14 embracing the print belt, the electromagnetic erasing head 15 and the electromagnetic print head 16 are arranged in succession in the direction of travel of the print belt 11.

Figure 8:
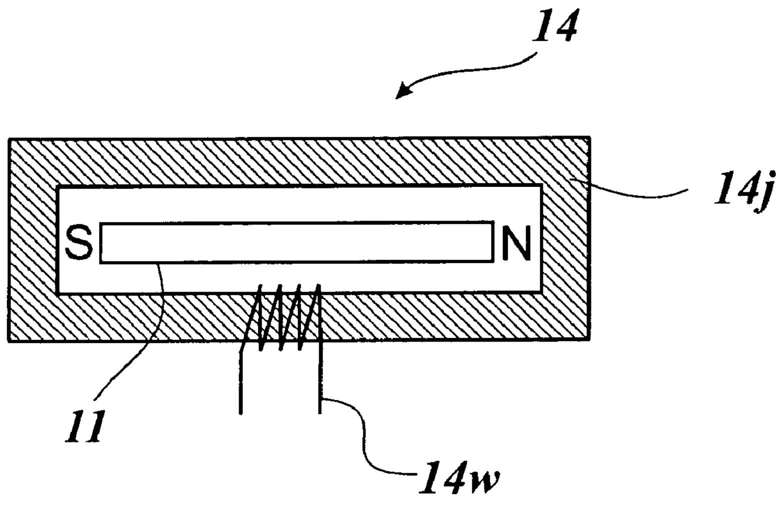
FIG. 8 is a diagrammatic view in section of a second writing head taken along section line VIII-VIII in FIG. 7.

As can be seen from the diagrammatic view in section in FIG. 8 the print head 14 embraces the print belt 11, with a yoke-shaped closed core 14*j*. The core 14*j* can be for example in the form of a core layered from dynamo sheet. The core 14*j* is surrounded portion-wise with a wire winding 14*w* so that a magnetic field is produced when a current flows therein. The magnetic field is so directed in that case that the magnetic field lines extend transversely with respect to the direction of movement and parallel to the outside and the inside respectively of the print belt 11. Both the elementary magnets of the print belt 11 and also the color effect pigments applied to the carrier film 12 in the decorative layer are oriented along those field lines.

When the image line produced in that way is positioned under the erasing head 15 by the motion of the print belt 11, the magnetic heads of the erasing head 15, which are provided to produce non-magnetic pixels, are now excited with preferably high-frequency alternating current. In that fashion the color effect pigments which are oriented by the print head 11 are put into a non-ordered position again in those pixels.

When now the image line is disposed under the print head 16, magnetic pixels whose field lines do not extend parallel to the surface of the print belt 11 are produced by the magnetic heads of the print head 16, which are actuated by the computer station 17. The field lines of the magnetic heads of the print head 16 are directed perpendicularly to the surface of the print belt 11 or to the surface of the carrier film 12 so that the color effect pigments are oriented along the field lines.

It can be provided in that respect that, upon actuation of the magnetic heads of the print head 16, the current strength and/or the current direction is or are varied so that the color effect pigments can be oriented at different angles relative to the surface of the carrier film 12. The magnetic field of the magnetic head can be so set that it is not capable of completely orienting the color effect pigments disposed beneath it. It can be provided that the process parameters are determined by test series, in which respect the position of the pixels in relation to adjacent pixels is also to be taken into consideration.

Unlike the first embodiment shown in FIG. 1, it is provided that the print heads 14 and 16 as well as the erasing head 15 are constantly in operation and in that case are controlled by the computer station 17 synchronously with respect to the printer 18. In that case it is also possible to dispense with a magnetisable print belt and a non-magnetic print belt can be provided for supporting the carrier film 12.

The duration of actuation of the magnetic heads can be varied as a further process parameter relating to orientation of the color effect pigments, in which case dynamic actuation can be particularly advantageous when the carrier substrate is moving at a high transport speed.

In a further configuration it can be provided that the erasing head 15 and/or the print head 16 is formed only with at least one magnetic head which is displaceable along an image line, driven by a stepping motor. Such a magnetic head can also be pivotable so that it can inclinedly orient the color effect pigments in a particularly simple fashion.

As already described hereinbefore with reference to FIG. 1 a fixing device 19 is arranged downstream of the writing head 16.

In the embodiment shown in FIG. 7 a print drum can also be provided instead of the print belt 11. Advantageously, the print drum can be made from non-magnetic material and can have the film 12 looped therearound. The print head 18, the embracing electromagnetic print head 14, the electromagnetic erasing head 15 and the electromagnetic print head 16 are correspondingly arranged in succession at the periphery of the print drum in the direction of rotation of the print drum, that is to say the film 12 passes the print heads and the erasing head respectively in the specified sequence.

Figure 9:
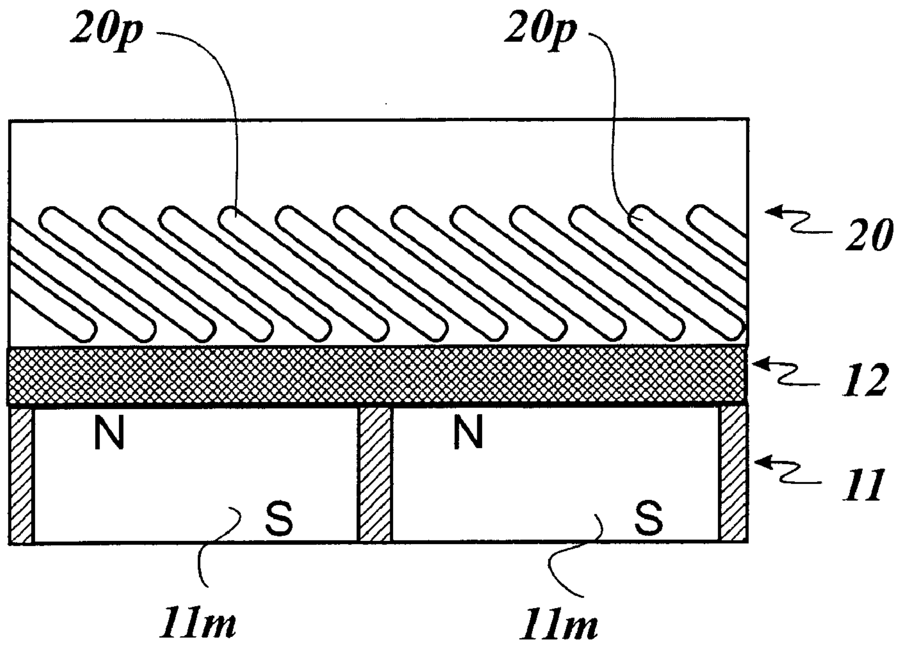
FIG. 9 is a diagrammatic view in section of a third example of the arrangement of color effect pigments.

FIG. 9 now shows a diagrammatic view illustrating a portion of the print belt 11 with magnetic pixels 11*m* whose magnetic field lines are oriented inclinedly relative to the surface of the print belt 11. The inclined orientation was produced by the magnetic pixels 11*m* being produced successively with the print head 14 and the print head 16, as described hereinbefore. The elementary magnets of the pixels 11*m* were oriented in parallel relationship with the surface of the carrier film 12 with the print head 14 and thereafter raised through about 45° with the print head 16. Consequently the color effect pigments 20*p* are also inclined through about 45° relative to the surface of the carrier film 12. They appear in a state of maximum brightness to the eye of the viewer when the carrier film 12 is pivoted in such a way that the viewing direction is perpendicularly on to the long side of the color effect pigments 20*p*. It can however also be provided, as described above, that the color effect pigments 20*p* are oriented solely by means of the print heads 14 and 16 or by means of one or more pivotable magnetic heads, without the assistance of the print belt 11.

Figure 10A:
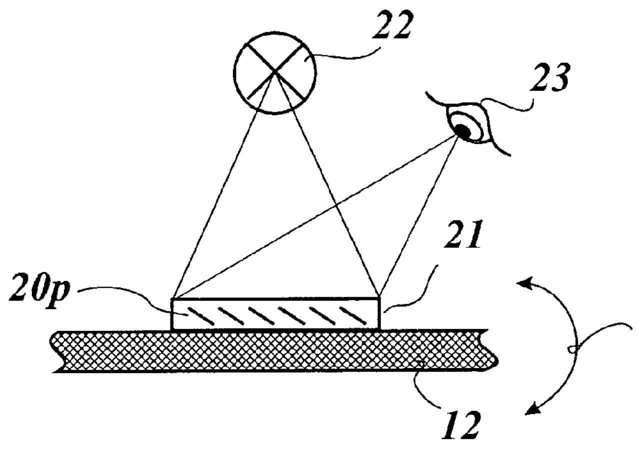
FIG. 10*a* is a view showing the principle of a second example of use.
Figure 10B:
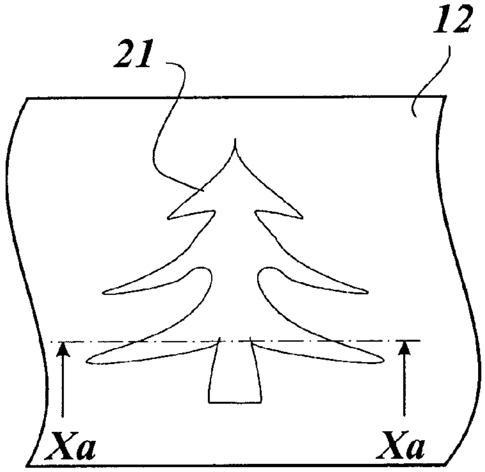
FIGS. 10*b* and 10*c* are plan views at different viewing angles for the example of use of FIG. 10*a*.
Figure 10C:
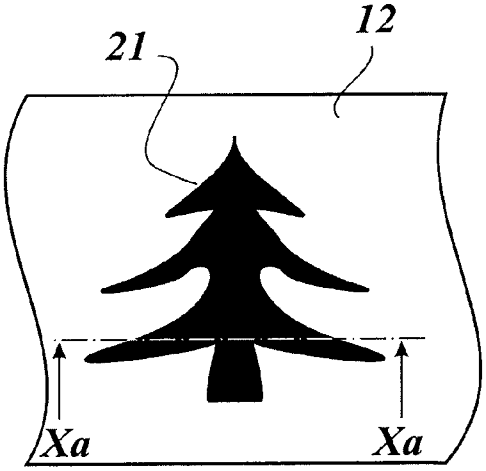

FIGS. 10*a* through 10*c* now show the optical effect which can be produced with the inclined arrangement of the color effect pigments 20*p* described with reference to FIG. 9. As shown in FIG. 10*a* the color effect pigments 20*p* are arranged inclinedly on the carrier film 12. FIG. 10*b* reproduces the image impression when the eye 23 of the viewer is looking on to the long sides of the color effect pigments 20*p* while FIG. 10*c* shows the impression when the eye 23 of the viewer is looking on to the ends of the color effect pigments 20*p*. Changes in brightness and/or color of the color effect image 21 are to be observed between the two extreme positions of the color effect image 21.

Figure 11:
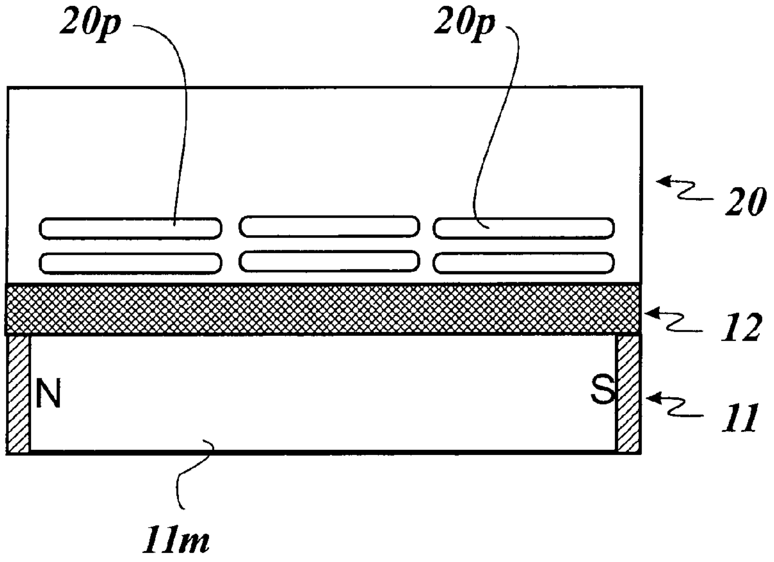
FIG. 11 is a diagrammatic view in section of a fourth example of an arrangement of color effect pigments.

FIG. 11 now shows a diagrammatic view illustrating a portion of the print belt 11 with magnetic pixels 11*m* whose magnetic field lines are oriented in parallel relationship with the surface of the print belt 11. The color effect pigments 20*p* are arranged in parallel relationship with the surface of the carrier film 12. Such a pixel, when viewed perpendicularly, appears as a bright pixel as all incident light is reflected. As described hereinbefore with reference to FIG. 7 the magnetic pixels 11*m* are produced with field lines oriented in parallel relationship with the surface of the print belt 11, by the print head 14 which completely embraces the print belt 11. It will be noted however that, with that orientation, the magnetic pixels 11*m* are able to exert only low forces on the magnetic color effect pigments 20*p* so that, as described hereinbefore with reference to FIG. 7, the direct orientation of the color effect pigments can be provided by the print head 14.

Figure 12:
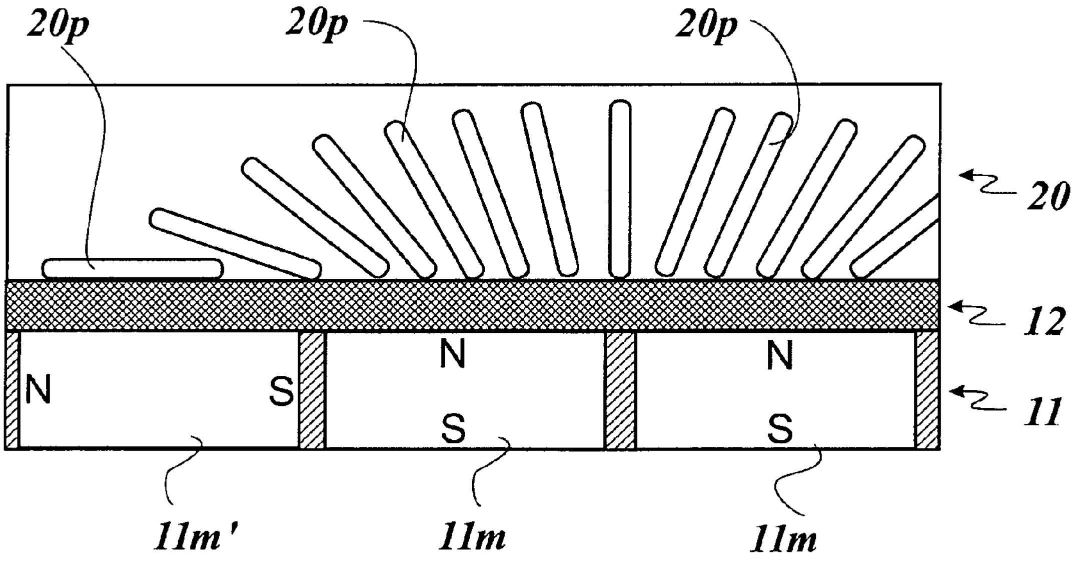
FIG. 12 is a diagrammatic view in section of a fifth example of an arrangement of color effect pigments.

FIG. 12 is a diagrammatic view showing a portion of the print belt 11 with magnetic pixels 11*m* and 11*m*' whose magnetic field lines are oriented in a fan configuration. Such an orientation is produced by the left-hand pixel 11*m*' being produced by the print head 14 and the two adjacent pixels 11*m* by the erasing head 15 and the print head 16. The two pixels 11*m* are produced with the same position in respect of the magnetic poles, that is to say the color effect pigments 20*p* arranged thereon repel each other. The color effect pigments 20*p* adjacent to the pixel 11*m*' are attracted thereby and therefore assume a marked inclined position.

Figure 13A:
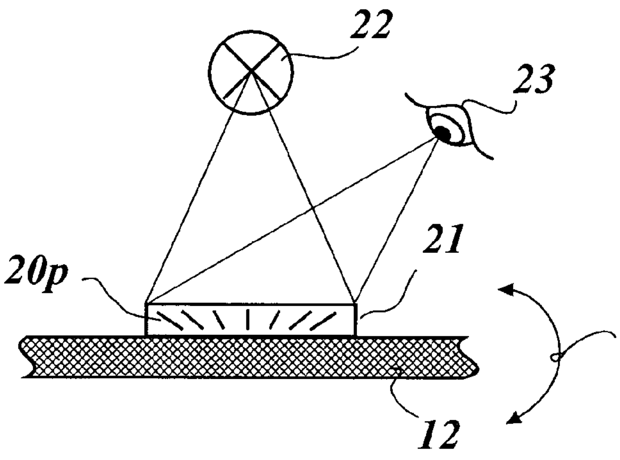
FIG. 13*a* is a view showing the principle of a third example of use.
Figure 13B:
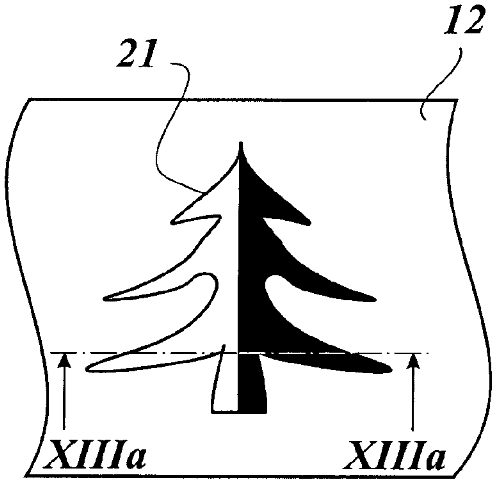
FIGS. 13*b* and 13*c* are plan views at different viewing angles for the example of use of FIG. 13*a*.
Figure 13C:
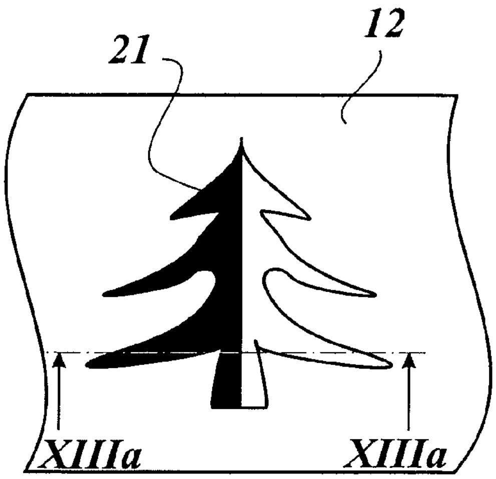

FIGS. 13*a* through 13*c* now show the optical effect which can be produced with the arrangement of the color effect pigments, shown in FIG. 12. To describe the arrangement, attention is directed to FIGS. 10*a* through 10*c*.

Upon a change in the viewing direction the eye 23 of the viewer, in the two outer extreme positions of the color effect image 21, is respectively directed on to the long sides of the color effect pigments 20*p* so that that side of the color effect pigment 21 appears light and the other side of the color effect pigment 21 dark. In the illustrated embodiment the color effect pigments 20*p* are arranged symmetrically with respect to the axis of symmetry of the color effect image 21 so that the axis of symmetry marks the light-dark limit of the color change.

Figure 14:
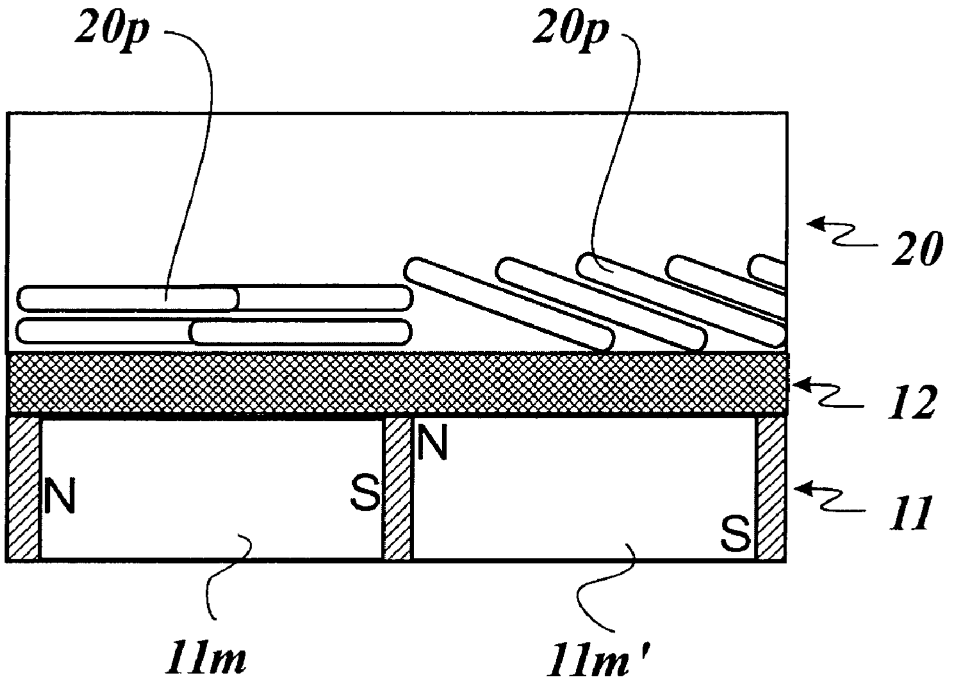
FIG. 14 is a diagrammatic view in section of a sixth example of an arrangement of color effect pigments.
Figure 15A:
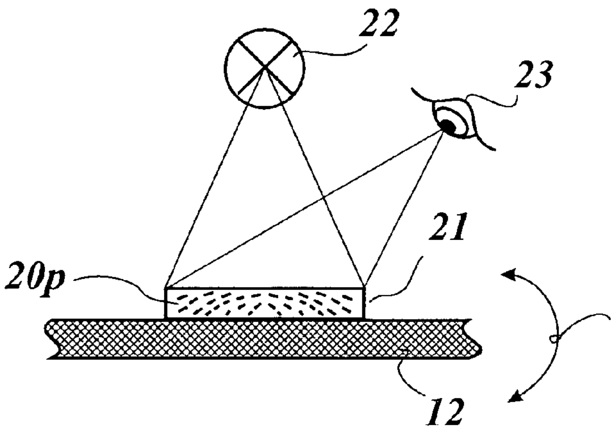
FIG. 15*a* is a view showing the principle of a fourth example of use.

FIG. 14 now shows a diagrammatic view illustrating a portion of the print belt 11 with magnetic pixels 11*m* and 11*m*' whose magnetic field lines are so oriented that the angle of inclination of the color effect pigments 20*p* increases or decreases from one pixel to another. FIG. 14 shows a central pixel 11*m* and a pixel 11*m*' adjacent thereto, of an image line. In that way the color effect pigments 20 can be arranged in an arcuate configuration on the carrier film 12, the effects of which are shown by means of an example in FIGS. 15*a* through 15*c*.

Figure 15B:
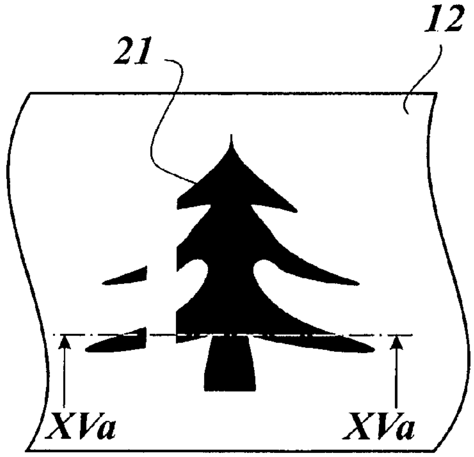
FIGS. 15*b* and 15*c* are plan views at different viewing angles for the example of use of FIG. 15*a*.
Figure 15C:
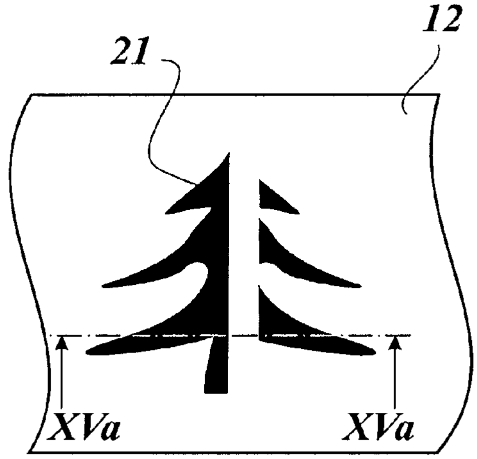

As can be seen from FIGS. 15*b* and 15*c*, upon pivotal movement of the carrier film 12 a light strip passes over the color effect image 21. That strip is caused by the color effect pigments 20*p* being successively moved into a position in which the eye 23 of the viewer is looking perpendicularly on to the long sides of the color effect pigments 20*p* so that the light reflected by the long sides is deflected completely into the eye 23 of the viewer and there produces a bright light impression.

The solution according to the invention is not restricted to the examples of use illustrated. Because the orientation of the color effect pigments is determined not just by the magnetic properties of the individual pixels but also by the arrangement of the pixels relative to each other, it is possible to produce many different color change effects which go beyond the illustrated embodiments. Such color change effects cannot be reproduced with a color copying process and therefore besides decorative purposes can preferably be used as a security feature.

The method according to the invention provides an effective and inexpensive method of producing color effect images, which is distinguished by a high level of flexibility, high processing speed and low operating costs.

What is claimed is:

1. A method of producing color effect images on a carrier substrate, comprising:

a latent magnetic image comprising magnetic pixels and non-magnetic pixels is produced on a magnetisable printing form, by means of an electromagnetic print head having two or more mutually juxtaposed magnetic heads, wherein the magnetic pixels differ in strength of magnetic field and/or in direction of magnetic field lines, a decorative layer provided with non-spherical, magnetic color effect pigments being applied to a carrier substrate, wherein the carrier substrate is moved past the magnetisable printing form so that color effect pigments of the decorative layer are changed in their orientation relative to the carrier substrate by a field line image produced by the magnetic pixels of the magnetisable printing form, the color effect pigments being fixed in the decorative layer in the orientation which is changed by the field line image of the printing form.

2. A method as set forth in claim 1 wherein, the carrier substrate and the printing form are moved at a speed which is identical in terms of value and direction as long as the color effect pigments are mobile in a binding agent so that the relative speed between the carrier substrate and the printing form is equal to zero.

3. A method as set forth in claim 1 wherein, mutually juxtaposed ones of the magnetic pixels are produced with a differing orientation.

4. A method as set forth in claim 1 wherein, the magnetic pixels are arranged to produce regions of the field line image, in which the magnetic field lines are directed in perpendicular relationship to the surface of the carrier substrate.

5. A method as set forth in claim 1 wherein, the magnetic pixels are arranged to produce regions of the field line image, in which the magnetic field lines are directed in parallel relationship to the surface of the carrier substrate.

6. A method as set forth in claim 1 wherein, the magnetic pixels are arranged to produce regions of the field line image, in which the magnetic field lines are directed in a fan form at different angles relative to the surface of the carrier substrate.

7. A method as set forth in claim 1 wherein, the magnetic pixels are arranged to produce regions of the field line image, in which the magnetic field lines are directed in an arcuate shape at different angles relative to the surface of the carrier substrate.

8. A method as set forth in claim 1 wherein, the magnetic color effect pigments are oriented by action of magnetic pixels and electromagnetic print heads.

9. A method as set forth in claim 1 wherein, the magnetic color effect pigments are oriented by a time succession of action of magnetic pixels and/or electromagnetic print heads.

10. A method as set forth in claim 8 wherein, one of the print heads is an electromagnetic print head which embraces the printing form orients the magnetic color effect pigments in parallel relationship with the top side of the carrier substrate, a different one of the print heads being an electromagnetic erasing head producing the non-magnetic pixels and the electromagnetic print head producing the magnetic pixels.

11. A method as set forth in claim 1 wherein, electromagnetic print heads which produce the latent magnetic image on the magnetisable printing form are actuated in accordance with a first digital data set which describes the arrangement of the magnetic pixels and non-magnetic pixels.

12. A method as set forth in claim 11 wherein, the first data set is computed from a second data set which describes the graphic configuration of the color effect image.

13. A method as set forth in claim 1 wherein, the decorative layer includes the magnetic color effect pigments incorporated in a binding agent in such a way that they can be oriented by a latent magnetic field.

14. A method as set forth in claim 13, wherein the magnetic color effect pigments are fixed after orientation in the decorative layer by drying of a binding agent.

15. A method as set forth in claim 13, wherein the magnetic color effect pigments are fixed after orientation in the decorative layer by cross-linking of a binding agent.

16. A method according to claim 15, wherein the binding agent is cross-linked by at least one of UV radiation, the application of heat, and by electron beam hardening.

17. A method as set forth in claim 1, wherein the carrier substrate is applied and removed in a roll-to-roll process.

* * * * *